United States Patent
Mevius et al.

(10) Patent No.: US 9,200,716 B2
(45) Date of Patent: Dec. 1, 2015

(54) SELF ALIGNING VALVE PLUG

(71) Applicant: EMERSON PROCESS MANAGEMENT REGULATOR TECHNOLOGIES, INC., McKinney, TX (US)

(72) Inventors: Jason S. Mevius, McKinney, TX (US); Guolei Fan, Chengdu (CN); Biao Zhou, Chengdu (CN)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 205 days.

(21) Appl. No.: 14/038,404

(22) Filed: Sep. 26, 2013

(65) Prior Publication Data

US 2014/0090719 A1  Apr. 3, 2014

(30) Foreign Application Priority Data

Sep. 28, 2012 (CN) .......................... 2012 1 0388194
Sep. 28, 2012 (CN) ...................... 2012 2 0524814 U (51) Int. Cl.
*F16K 31/12* (2006.01)
*F16K 17/02* (2006.01)
(Continued)

(52) U.S. Cl.
CPC . *F16K 17/02* (2013.01); *F16K 1/36* (2013.01); *F16K 1/42* (2013.01); *F16K 17/042* (2013.01); *G05D 16/0694* (2013.01); *Y10T 137/0519* (2015.04); *Y10T 137/7801* (2015.04)

(58) Field of Classification Search
CPC ............. F16K 1/48; F16K 17/02; F16K 1/36; F16K 1/42; F16K 17/042; G05D 16/0694; Y10T 137/7801; Y10T 137/0519; Y10T 137/7809
See application file for complete search history.

(56) References Cited

U.S. PATENT DOCUMENTS 4,742,845 A * 5/1988 Capoccia et al. ............. 137/510
5,279,327 A * 1/1994 Alsobrooks et al. .......... 137/510
(Continued)

FOREIGN PATENT DOCUMENTS

CH 694 279 A5 10/2004
DE 4424724 A1 * 2/1996
(Continued)

OTHER PUBLICATIONS

Machine Translation of CH694279A5 from EPO website.*
(Continued)

*Primary Examiner* — Jessica Cahill
(74) *Attorney, Agent, or Firm* — Marshall, Gerstein & Borun LLP (57) ABSTRACT

A balanced pressure regulator includes a valve body having a fluid inlet and a fluid outlet connected by a fluid passageway. A valve seat is disposed within the fluid passageway. A self-aligning valve plug is at least partially disposed within the fluid passageway, the self-aligning valve plug interacting with the valve seat to selectively open or close the fluid passageway. A retainer is partially disposed within a bore of the self-aligning valve plug and operatively connects the self-aligning valve plug to a valve stem having a ball portion. More specifically, the retainer includes a recess adapted to receive the ball portion of the valve stem, such that the self-aligning valve plug automatically rotates around the ball portion of the valve stem to achieve alignment and sealing engagement between a valve disc of the self-aligning valve plug and the valve seat.

29 Claims, 6 Drawing Sheets

(51) Int. Cl.
  *F16K 1/36* (2006.01)
  *F16K 1/42* (2006.01)
  *F16K 17/04* (2006.01)
  *G05D 16/06* (2006.01)

(56) References Cited

U.S. PATENT DOCUMENTS

| | | | |
|---|---|---|---|
| 5,609,138 A * | 3/1997 | Mutschler | 123/463 |
| 6,802,340 B1 * | 10/2004 | Gutmann et al. | 137/510 |
| 2002/0074043 A1 * | 6/2002 | Beyer et al. | 137/587 |
| 2006/0237064 A1 * | 10/2006 | Benson | 137/487.5 |
| 2009/0261281 A1 | 10/2009 | Mevius et al. | |
| 2010/0071786 A1 * | 3/2010 | Hawkins et al. | 137/485 |
| 2010/0269925 A1 * | 10/2010 | Roper et al. | 137/505.37 |
| 2012/0234407 A1 * | 9/2012 | Edwards et al. | 137/505 |

FOREIGN PATENT DOCUMENTS

| | | |
|---|---|---|
| GB | 157 955 A | 2/1922 |
| WO | WO-2012/012829 A2 | 2/2012 |

OTHER PUBLICATIONS

Search Report for PCT/US2013/062097, mailed Nov. 26, 2013.
Written Opinion for PCT/US2013/062097, mailed Nov. 26, 2013.

* cited by examiner

PRIOR ART

FIG. 6

SELF ALIGNING VALVE PLUG

FIELD OF THE DISCLOSURE

The present disclosure relates to balanced pressure regulators, and more particularly, to a self-aligning valve plug for a balanced pressure regulator.

BACKGROUND OF THE DISCLOSURE

Pressure regulating valves are used in myriad industrial and residential applications for controlling the downstream pressure of a fluid. For example, in chemical processing plants or oil refineries, pressure regulating valves are used to manipulate a flowing fluid to compensate for increases or decreases in demand, or other load disturbances, and thus keep the fluid pressure regulated. Similarly, pressure regulating valves may be used in plumbing fixtures to maintain a pre-determined pressure of fluid that automatically adjusts to variations in demand, such as anti-scald valves in showers or faucets. By controlling downstream pressure, pressure regulating valves compensate for variations in downstream demand. For example, as downstream demand increases, pressure regulating valves open to allow more fluid to flow through the pressure regulating valve, thus maintaining a relatively constant downstream pressure. On the other hand, as downstream demand decreases, pressure regulating valves close to reduce the amount of fluid flowing through the pressure regulating valve, again maintaining a relatively constant downstream pressure.

Pressure regulating valves can be categorized as either balanced or unbalanced. Unbalanced valves typically have high pressure inlet fluid on one side of the valve plug and lower pressure outlet fluid on the other side of the valve plug. Unbalanced valves suffer from an undesirable effect known as decaying inlet characteristic. The decaying inlet characteristic is a phenomenon in which an unbalanced valve experiences an unintended increase in downstream pressure as the upstream pressure decreases. This effect is undesirable as most pressure regulating valves attempt to maintain a constant downstream pressure. Decaying inlet characteristic is caused by fluid forces on the high pressure side of the valve plug attempting to move the valve plug to a closed position. As a result, the valve must have some mechanism to oppose this fluid force on the valve plug. Because the mechanism that opposes the fluid force typically has a set point, the force generated by such a mechanism is constant while the fluid force on the inlet side of the valve plug may vary (e.g., due to a decreasing supply of inlet fluid, or due to pressure variations upstream of the valve). Decaying inlet characteristic is particularly important to applications having a limited compressed fluid source, such as gas cylinders, tube trailers, or hydrils, because in such applications, there is a fixed supply of inlet fluid and thus, the inlet fluid pressure decreases as the inlet fluid supply decreases.

Unbalanced valves also suffer from damage that occurs to the valve seat. In unbalanced valves with high inlet pressures, the fluid pressure acting on large valve orifices can crush the valve seat. As a result, unbalanced valves are not ideal for high pressure, large orifice applications.

To address the decaying inlet characteristic in higher flow applications, balanced pressure regulators were developed. In the balanced pressure regulator, a portion of the upstream pressure is diverted to act on a downstream portion of the valve plug. Thus, the valve plug is "balanced," having the same fluid pressure act on both upstream and downstream portions of the valve plug. In this way, the decaying inlet characteristic is eliminated (or greatly reduced) because there is no difference in the fluid forces acting on valve plug surfaces both upstream and downstream of the valve seat that would tend to force the valve plug towards the closed position. In other words, the valve plug itself generates very little, or no opening/closing forces due to fluid pressures.

In diaphragm-type pressure regulators, higher pressure fluid from an upstream or inlet side of the valve plug may be vented through the valve plug to an opposite side of the diaphragm to balance forces on the valve plug, similar to the balanced regulators described above. Typically, this balancing of fluid forces is accomplished by incorporating one or more vent channels or ports that extend through the valve plug from the inlet side to an actuator side of the diaphragm.

Figure 1:
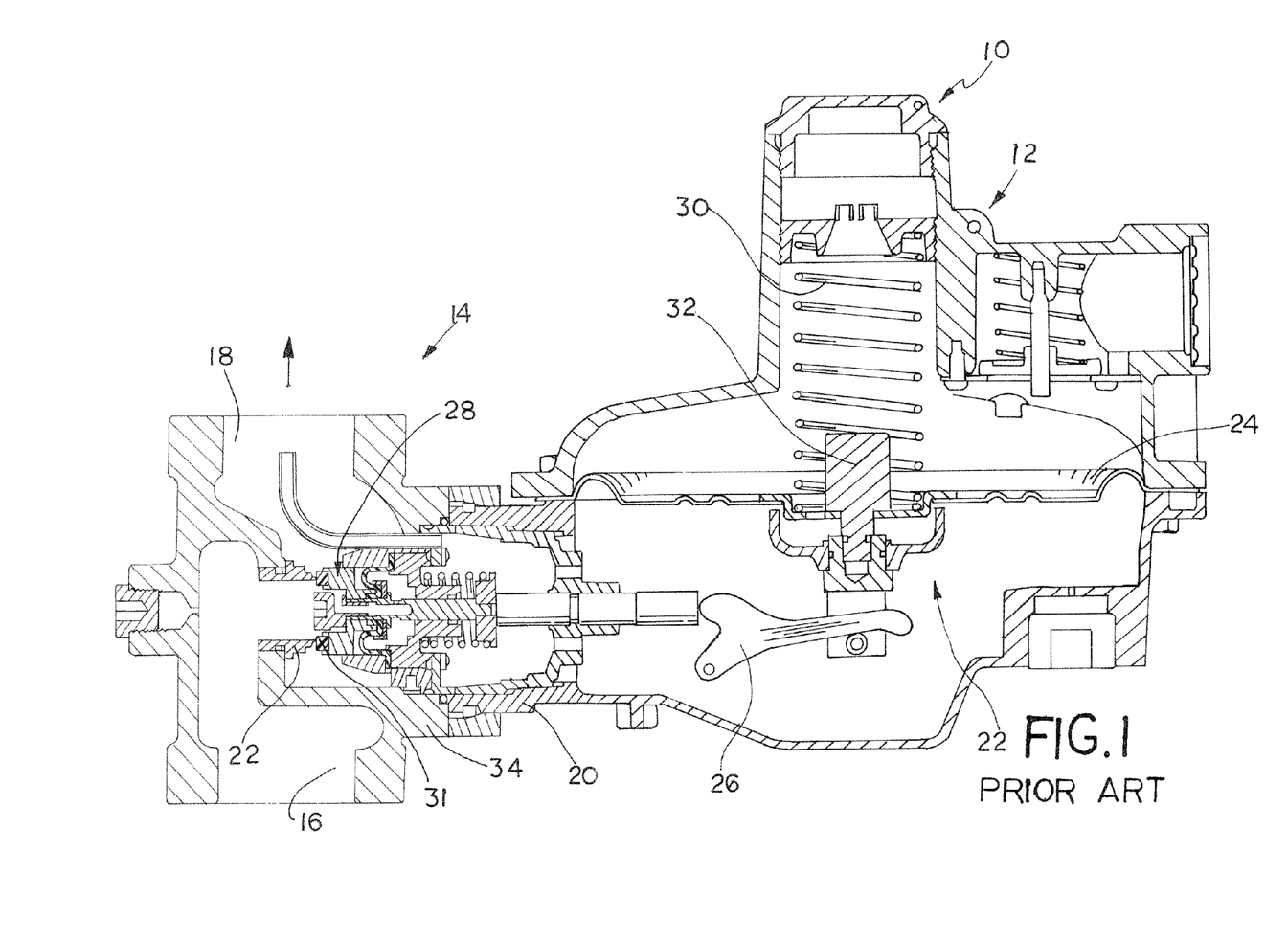
FIG. 1 is a side cross-sectional view of a conventional gas regulator having a balanced pressure regulator.

A typical diaphragm-type (balanced) pressure regulator valve is illustrated in FIG. 1. More specifically, FIG. 1 depicts one conventional gas regulator 10 comprising an actuator 12 and a balanced pressure regulator valve 14. The regulator valve 14 defines an inlet 16 for receiving gas from a gas distribution system, for example, and an outlet 18 for delivering gas to an end-user facility such as a factory, a restaurant, an apartment building, etc. having one or more appliances, for example. Additionally, the regulator valve 14 includes a valve seat 22 disposed between the inlet 16 and the outlet 18. Gas must pass through the valve seat 22 to travel between the inlet 16 and the outlet 18 of the regulator valve 14.

The actuator 12 is coupled to the regulator valve 14 to ensure that the pressure at the outlet 18 of the regulator valve 14, i.e., the outlet pressure, is in accordance with a desired outlet or control pressure. The actuator 12 is therefore in fluid communication with the regulator valve 14 via a valve mouth 34 and an actuator mouth 20. The actuator 12 includes a control assembly 22 for regulating the outlet pressure of the regulator valve 14 based on sensed outlet pressure. Specifically, the control assembly 22 includes a diaphragm 24, a piston 32, and a control arm 26 having a valve plug 28 with a valve disc 31. The diaphragm 24 senses the outlet pressure of the regulator valve 14 and provides a response to move the valve plug 28 to open and close the regulator valve 14. The control assembly 22 further includes a control spring 30 in engagement with a top-side of the control assembly 22 to offset the outlet pressure sensed by the diaphragm 24. Accordingly, the desired outlet pressure, which may also be referred to as the control pressure, is set by the selection of the control spring 30.

The diaphragm 24 is operably coupled to the control arm 26, and therefore, the valve plug 28, via the piston 32, and controls the opening of the regulator valve 14 based on the sensed outlet pressure. For example, when an end user operates an appliance, such as a furnace, for example, that places a demand on the gas distribution system downstream of the regulator 10, thereby decreasing the outlet pressure. Accordingly, the diaphragm 24 senses this decreased outlet pressure. This allows the control spring 30 to expand and move the piston 32 and the right-side of the control arm 26 downward, relative to the orientation of FIG. 1. This displacement of the control arm 26 moves the valve plug 28 away from the valve seat 22 to open the regulator valve 14, thereby increasing the outlet flow to meet the increased demand from the appliance and increasing the outlet pressure back to the control pressure. So configured, the appliance may draw gas through the valve seat 22 and through the outlet 18 of the regulator valve 14.

Figure 2:
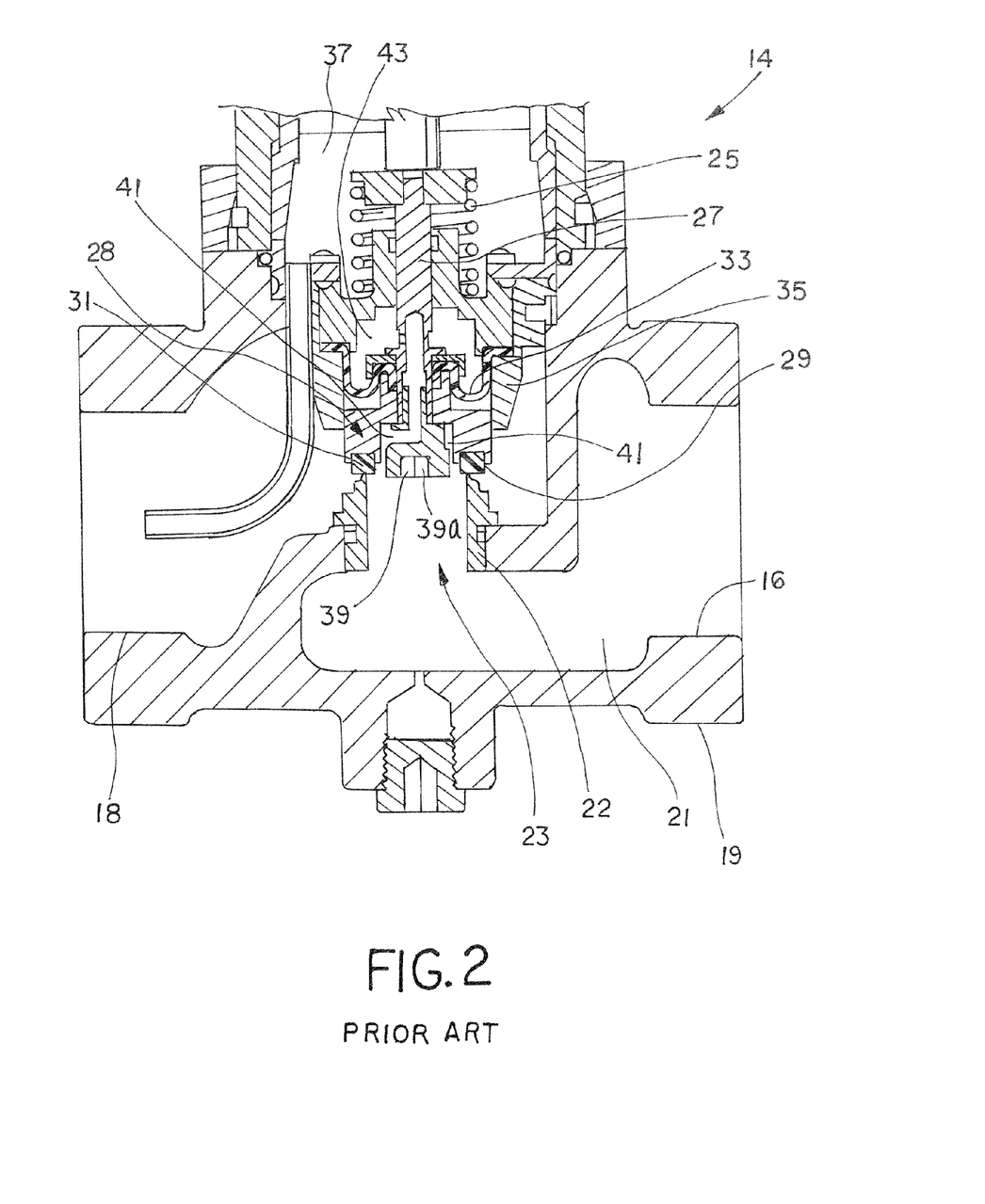
FIG. 2 is an enlarged side cross-sectional view of the balanced pressure regulator of FIG. 1.

Referring now to FIG. 2, an enlarged cross-sectional view of the balanced regulator valve 14 of FIG. 1 is illustrated. In this example, the balanced regulator valve 14 further includes a body 19 having a passage 21 that fluidly connects the fluid inlet 16 with the fluid outlet 18. The passage 21 includes a throat 23 in which the valve seat 22 is disposed. A load spring 25 is connected to a valve stem 27 that is operatively attached to the valve plug 28. As explained, the valve disc 131 of the valve plug 28 interacts with the valve seat 22 to control fluid flow through the valve body 19 from the inlet 16 to the outlet 18. In addition, the valve plug 28 includes a circumferential recess 29 into which the valve disc 31, which is typically rubber, is disposed. The valve disc 31 of the valve plug 28 contacts the valve seat 22 to achieve alignment and sealing engagement between the valve plug 28 and the valve seat 22.

A diaphragm 33 is connected to the valve plug 28 and a plug housing or sleeve 35. The diaphragm 33 separates the passage 21 from a cavity 37 in the sleeve 35 that contains the load spring 25. The diaphragm 33 is responsive to pressure differences between the passage 21 and the cavity 37.

A retainer 39 may be operatively attached to the valve stem 27 and retains the valve plug 28 on the valve stem 27. The retainer 39 may include one or more fasteners 39a, such as a nut, which are attached to the valve stem 27. One or more balancing passages or channels 41 fluidly connect the passage 21 with a chamber 43 located between the valve plug 28 and the cavity 37. Fluid forces on the valve plug 28 are balanced by fluid moving through the balancing channels 41.

Figure 3A:
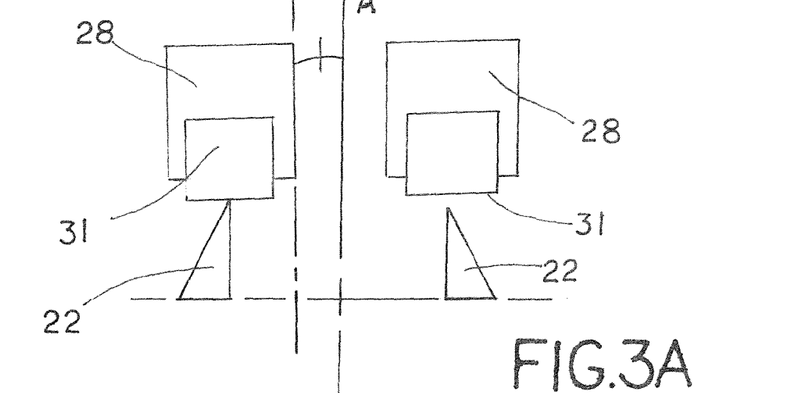
Figure 3B:
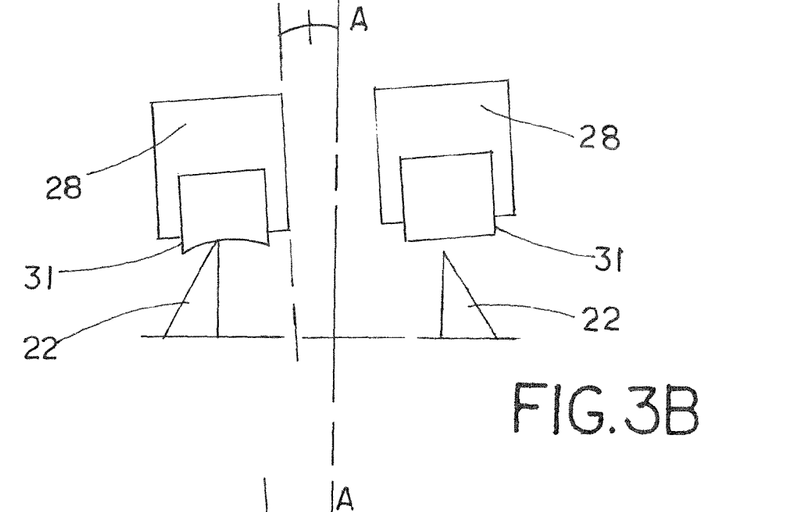
Figure 3C:
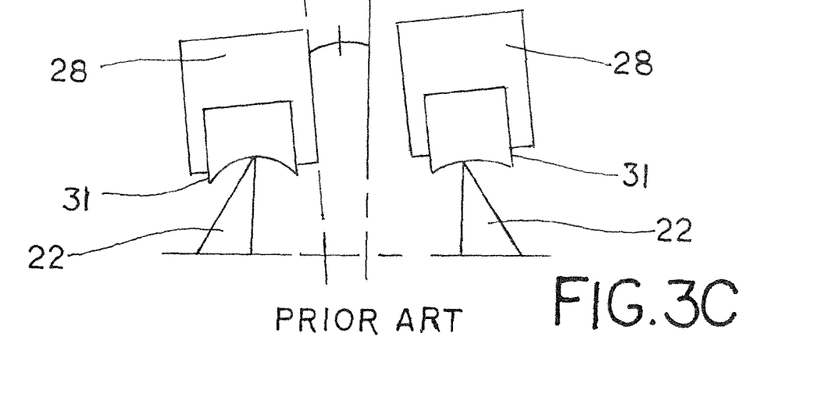

One problem with balanced pressure regulators, such as the balanced regulator 14 illustrated in FIG. 1, is that a contact seal between the valve disc 31 of the valve plug 28 and the valve seat 22 is affected by orientation and manufacturing tolerances between the disc 31 and valve seat 22. Such orientation and manufacturing tolerances often increase the amount of pressure required to make a seal, increasing lockup. For example, and as illustrated in FIG. 3A, due to normal part tolerances and assembly methods, for example, the valve disc 31 of the valve plug 28 often approaches the valve seat 22 in a non-parallel manner. When such a non-parallel approach occurs, a seal between the disc 31 of the valve plug 28 and the valve seat 22 is made on only one side of the valve seat 22, e.g., the left side, as illustrated in FIG. 3B. The other side of the valve seat 22, e.g., the right side, remains unsealed. As illustrated in FIG. 3C, when a complete seal is eventually achieved, one side of the valve disc 131 that initially contacts the valve seat 22 has a deeper indentation, resulting in a higher lockup or outlet pressure than desired and a less efficient regulator.

SUMMARY

In accordance with a first exemplary aspect, a balanced pressure regulator includes a valve body having a fluid inlet and a fluid outlet connected by a fluid passageway, a valve seat disposed within the fluid passageway, and a self-aligning valve plug at least partially disposed within the fluid passageway. The self-aligning valve plug includes a bore and interacts with the valve seat to selectively open or close the fluid passageway. A retainer is partially disposed within the bore of the self-aligning valve plug and operatively connects the self-aligning valve plug to a valve stem having a ball portion, the retainer having a recess for receiving the ball portion of the stem. The balanced pressure regulator further includes a diaphragm separating a chamber from a fluid passageway and a balancing passage that fluidly connects the fluid passageway with the chamber. The self-aligning valve plug automatically rotates around the ball portion of the valve stem to achieve alignment and sealing engagement between a valve disc of the self-aligning valve plug and the valve seat.

In accordance with a second exemplary aspect, a balanced plug assembly for a balanced pressure regulator includes a sleeve, a self-aligning valve plug disposed within the sleeve, the self-aligning valve plug including a balancing channel and a bore, and a retainer partially disposed within the bore of the self-aligning valve plug. The retainer operatively connects the self-aligning valve plug to the valve stem and includes a recess adapted to receive a ball portion of the valve stem. When a portion of the valve seat contacts the valve disc of the self-aligning valve plug, the self-aligning valve plug and the retainer partially disposed therein automatically rotate about one or more of a longitudinal axis of the valve stem or an axis perpendicular to the longitudinal axis of the valve stem until alignment and sealing engagement between the valve disc and the valve seat occurs.

In accordance with a third exemplary aspect, a method of automatically adjusting a valve plug for use with a fluid regulating device, the fluid regulating device including an inlet, an outlet, a valve seat disposed between the inlet and the outlet, the valve plug adapted to be displaced relative to the valve seat, thereby controlling the flow of a fluid between the inlet and the outlet disposed within a regulator valve, the method comprising partially disposing a retainer within a bore of a valve plug, connecting the valve plug to a valve stem having a flexible portion via the retainer, the retainer having a recess for receiving the flexible portion of the valve stem, and automatically adjusting the valve plug around the flexible portion of the valve stem to achieve alignment and sealing engagement between a valve disc of the self-aligning valve plug and the valve seat.

In further accordance with any one or more of the foregoing first, second, and third aspects, a balanced pressure regulator and/or a balanced plug assembly and/or method may further include any one or more of the following preferred forms.

In some preferred forms, the retainer partially disposed within the self-aligning valve plug rotates around the ball portion of the valve stem to achieve alignment between the valve disc of the self-aligning valve plug and the valve seat. In addition, the self-aligning valve plug may include a circumferential recess adapted to receive the valve disc. The self-aligning valve plug may also rotate in one of a clockwise or counterclockwise direction relative to one or more of a longitudinal axis of the valve stem or an axis perpendicular to the longitudinal axis of the valve stem until alignment and sealing engagement between the valve disc of the self-aligning valve plug and the valve seat is achieved. Further, upon contact with a portion of the valve seat, the self-aligning valve plug may automatically move from a first position in which a longitudinal axis of the valve plug is not parallel to or disposed at an angle from the longitudinal axis of the valve seat to a second position in which the longitudinal axis of the valve plug is parallel to or aligned with the longitudinal axis of the valve seat. The retainer may include a base and a cylindrical body attached to the base via a fastener, and the cylindrical body may include a flange extending radially from an end of the cylindrical body disposed opposite the base. Still further, the cylindrical body may include a top surface and the flange includes an inner side wall, such that the top surface of the cylindrical body and the inner side wall form the recess adapted to receive the ball portion of the valve stem to operatively connect the valve stem with the self-aligning valve plug. A ball joint connection may also be formed between the ball portion of the valve stem and the recess, the recess forming a socket to receive the ball portion of the stem. In another example, the ball portion of the valve stem contacts at least one edge of the top surface of the cylindrical body of the retainer to form the ball joint connection, allowing a longitudinal axis of the self-aligning valve plug to align with a longitudinal axis of the valve seat.

In other preferred forms, a gap is disposed between the flange of the cylindrical body of the retainer and the self-aligning valve plug, and a biasing member is disposed within the gap.

In preferred method forms, automatically adjusting the valve plug may comprise rotating the retainer around the flexible portion of the valve stem to achieve alignment and sealing engagement between the valve disc of the valve plug and the valve seat, reducing a force required to achieve lockup. In another example, automatically adjusting the valve plug may comprise rotating the valve plug in one of a clockwise or counterclockwise direction relative to an axis perpendicular to the longitudinal axis of the valve stem and moving the valve plug in an axial direction along the length of the longitudinal axis of the valve stem until alignment and sealing engagement between the valve disc of the valve plug and the valve seat is achieved. In yet another example, automatically adjusting the valve plug may comprise automatically moving the valve plug, upon contact with a portion of the valve seat, from a first position in which a longitudinal axis of the valve plug is not parallel to or disposed at an angle from the longitudinal axis of the valve seat to a second position in which the longitudinal axis of the valve plug is parallel to or aligned with the longitudinal axis of the valve seat.

In other preferred method forms, partially disposing a retainer within the bore of the valve plug may comprise partially disposing a cylindrical body having a flange radially extending therefrom within an end of the bore of the valve plug and disposing a retainer base within another end of the bore opposite the end in which the cylindrical body is partially disposed. In addition, partially disposing the retainer within the bore of the valve plug may further comprise attaching the retainer base to the cylindrical body via a fastener.

In addition, the flexible portion of the valve stem may comprise a ball portion, and the method may further comprise forming a ball joint connection between the ball portion of the valve stem and a recess of the retainer, the recess forming a socket to receive the ball portion of the stem. Still further, the method may comprise simultaneously rotating the valve plug and the retainer around the ball portion of the valve stem or a longitudinal axis of the valve stem upon contact with a portion of the valve seat.

BRIEF DESCRIPTION OF THE DRAWINGS

FIGS. 3A-3C are schematic illustrations of a valve plug and a valve seat of the prior art balanced regulator of FIG. 1, wherein FIG. 3A illustrates a first position of the valve plug as it approaches the valve seat, FIG. 3B illustrates a second position of the valve plug as it further approaches the valve seat, and FIG. 3C illustrates a third position of the valve plug as it contacts the valve seat to achieve alignment and a sealing engagement between the valve plug and the valve seat;

While the disclosure is susceptible to various modifications and alternative constructions, certain illustrative embodiments thereof have been shown in the drawings and will be described in detail below. It should be understood, however, that there is no intention to limit the disclosure to the specific forms disclosed, but on the contrary, the intention is to cover all modifications, alternative constructions, and equivalents falling within the spirit and scope of the invention.

DETAILED DESCRIPTION

Figure 4:
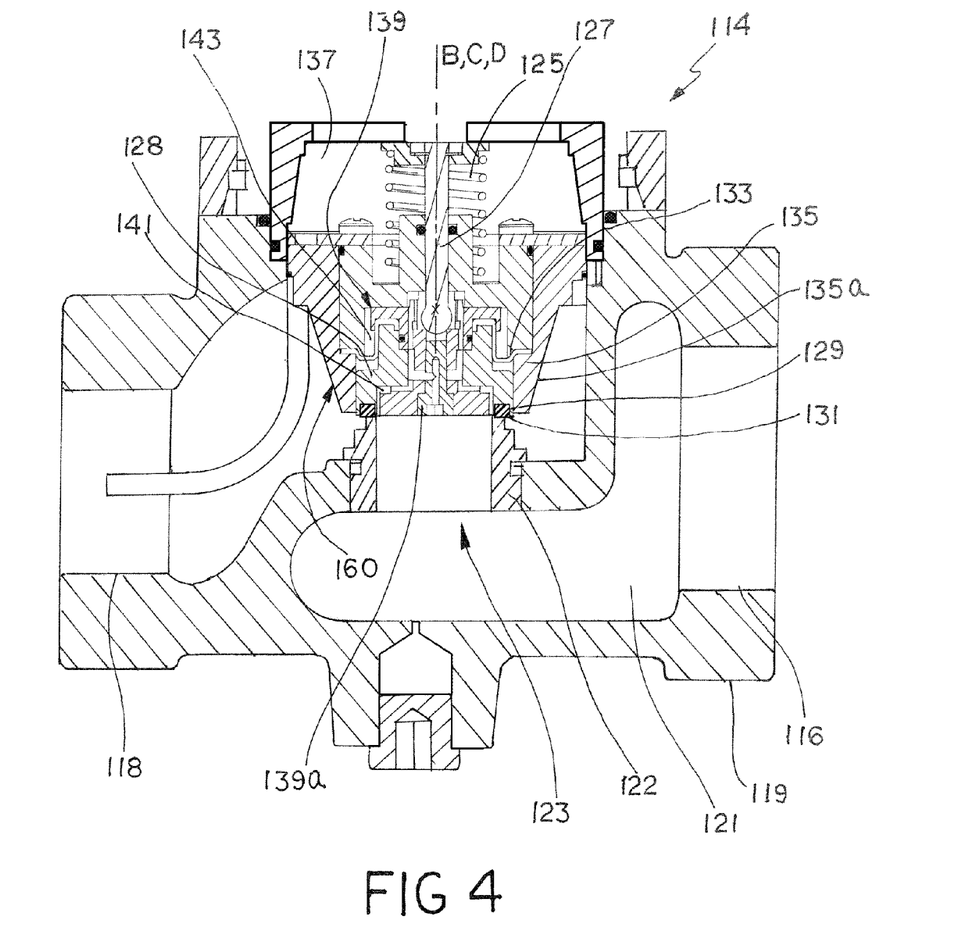
FIG. 4 is a cross-sectional view of a balanced pressure regulator constructed in accordance with the teachings of the present disclosure that may be used with the actuator of FIG. 1.
Figure 5:
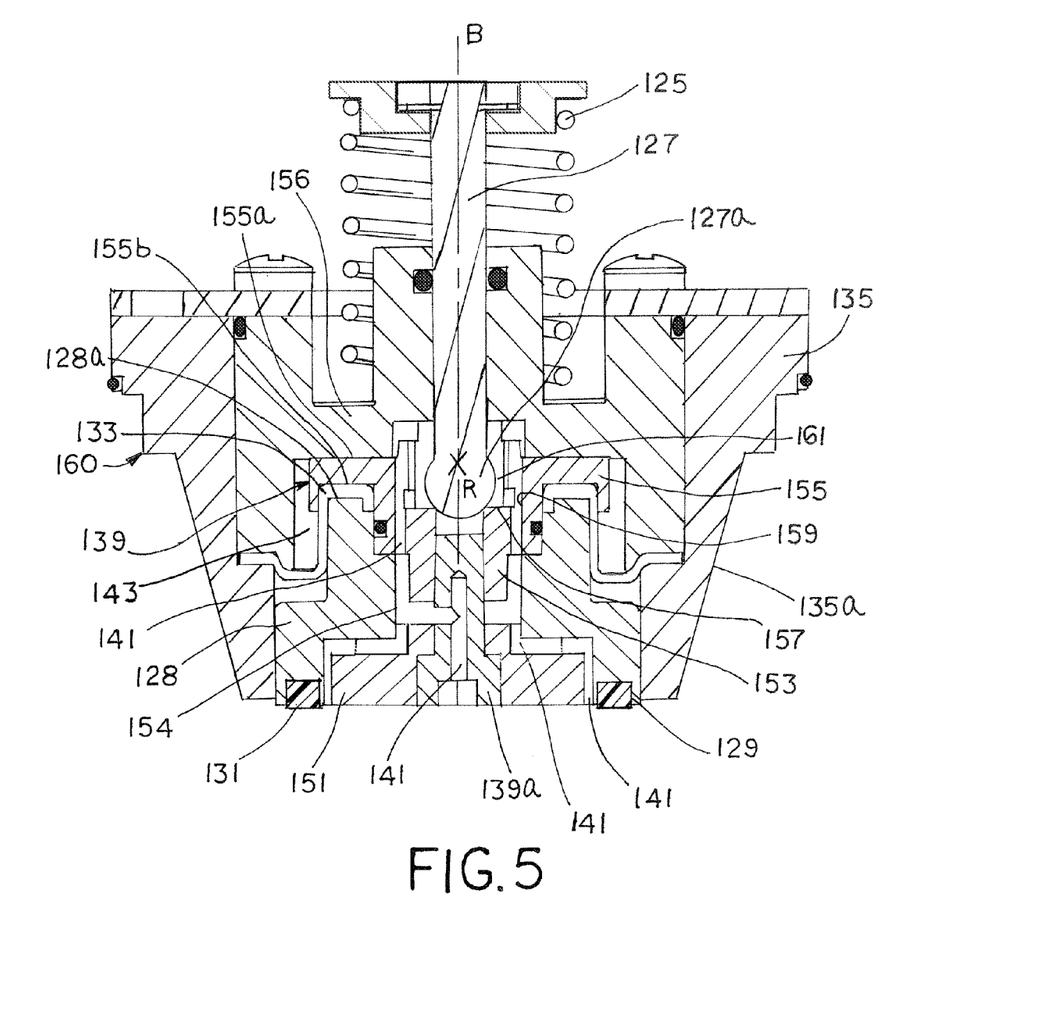
FIG. 5 is an enlarged cross-sectional view of a self-aligning valve plug of the balanced pressure regulator of FIG. 4 constructed in accordance with the teachings of the present disclosure.

Referring now to FIGS. 4-5, a balanced pressure regulator is generally referred to by reference numeral 114 in FIG. 4. Where the balanced pressure regulator of FIGS. 4 and 5 includes elements that correspond to the elements of the balanced pressure regulator of FIGS. 1-2, those elements will be numbered similarly, the only difference being that the reference numerals of FIGS. 4-5 are increased by a multiple of 100. For example, corresponding elements of FIGS. 4 and 5 will be numbered exactly 100 greater than the corresponding elements illustrated in FIGS. 1-2.

Turning now to FIG. 4, the balanced pressure regulator valve 114 includes a fluid inlet 116 and a fluid outlet 118 and a body 119 having a passage 121 that fluidly connects the fluid inlet 116 with the fluid outlet 118. The passage 121 includes a throat 123 in which a valve seat 122 is disposed. A load spring 125 is connected to a valve stem 127 that is operatively attached to a self-aligning valve plug 128. The self-aligning valve plug 128 interacts with the valve seat 122 to control fluid flow between the inlet 116 and the outlet 118. More specifically, the self-aligning valve plug 128 includes a circumferential recess 129 into which a rubber disc 131 is disposed. The disc 131 of the self-aligning valve plug 128 contacts the valve seat 122 to achieve alignment and sealing engagement between the self-aligning valve plug 128 and the valve seat 122, as explained in more detail below.

A balanced plug assembly 160 includes a sleeve 135, the self-aligning valve plug 128, and a retainer 139. The sleeve 135 has a hollow bore that helps retain and guide the self-aligning valve plug 128 as the self-aligning valve plug 128 reciprocates within the valve body 119 to control fluid flow. The sleeve 135 may have an angled surface outer surface 135a to enhance clearance within the valve body 119 and/or enhance assembly of the pressure regulator 114.

A diaphragm 133 is connected to the self-aligning valve plug 128 and the sleeve 135. The diaphragm 133 separates the passage 121 from a cavity 137 in the housing 119 that contains the load spring 125. The diaphragm 133 is responsive to pressure differences between the passage 121 and the cavity 137.

A retainer 139 is operatively attached to the valve stem 127 and retains the self-aligning valve plug 128 within the sleeve 135. The retainer 139 includes a fastener 139a, such as a threaded bolt in this example, which is operatively attached to a portion of the valve stem 127, as will be described in more detail below. One or more balancing passages or channels 141 fluidly connect passage 121 with a chamber 143 located between the self-aligning valve plug 128 and the cavity 137. Fluid forces on the self-aligning valve plug 128 are balanced by fluid moving through the balancing channels 141 and up to the chamber 43, for example.

As illustrated in FIG. 4, a longitudinal axis D of the self-aligning valve plug 128 is disposed parallel to a longitudinal axis C of the valve seat 122, and complete sealing engagement between the valve disc 131 of the self-aligning valve plug 128 and the valve seat to occur.

Referring now to FIG. 5, an enlarged portion of the balanced plug assembly 160 of FIG. 4 is illustrated. The self-aligning valve plug 128 of the balanced plug assembly 160 is designed such that it is self-aligning or capable of automatically adjusting or moving to achieve alignment and sealing engagement between the valve disc 131 of the self-aligning valve plug 128 and the valve seat 122. The self-aligning valve plug 128 reduces indentations to the valve disc 131 during operation of the regulator valve 114, for example. As a result, the force required to achieve the desired outlet pressure (lockup) during extended use of the regulator 100, for example, is maintained constant and regulator performance is improved.

To do so, in general, the self-aligning valve plug 128 is so configured such that it is operatively connected to the valve stem 127 via the retainer 139 such that a ball portion 127a of the valve stem 127 is disposed within a recess of the retainer 139, essentially forming a ball joint between the valve stem 127 and the retainer 139. The self-aligning valve plug 128 and the retainer 139 partially disposed therein are able to rotate around the ball portion 127a of the valve stem 127 during operation of the valve to achieve proper alignment and sealing engagement between the valve disc 131 of the self-aligning valve plug 128 and the valve seat 122. In other words, when the valve disc 131 of the self-aligning valve plug 128 contacts a portion of the valve seat 122, the self-aligning valve plug 128 and the retainer 139 rotate around the ball portion 127a of the valve stem 127 to achieve a position parallel to the longitudinal axis C of the valve seat 122 (FIG. 4) and alignment and sealing engagement with the valve seat 122 occur.

In particular, the retainer 139 includes a cylindrical portion 153 having a flange 155 extending radially therefrom, such that the cylindrical portion 153 and the flange 155 may form a retaining nut in one example. The cylindrical portion 153 of the retainer 139 is disposed within a bore 154 of the self-aligning valve plug 128. The flange 155 includes a top shoulder surface 155a that abuts a diaphragm housing 156. The flange 155 also includes a bottom shoulder surface 155b that abuts a portion the diaphragm 133 disposed between a top shoulder surface 128a of the self-aligning valve plug 128 and the bottom shoulder surface 155b of the flange. A retainer base 151 is disposed within an end of the bore located opposite to the end in which the cylindrical portion 153 is disposed. The retainer base 151 helps retain the self-aligning valve plug 128 within the throat 123 and prevents unwanted axial displacement of the self-aligning valve plug 128 outside of the sleeve 135, for example. A fastener 139a having a center hole for receiving inlet pressure during operation of the valve 114 connects the retainer base 151 to the cylindrical body 153 of the retainer 139. The cylindrical body 153 includes a top surface 157, and the flange 155 includes an inner side wall 159, such that a recess 161 is formed between the top surface 157 of the cylindrical body 153 and the inner side wall 159 of the flange 155.

As further illustrated in FIG. 5, the stem 127 includes the ball portion 127a that fits within the recess 161 formed between the top surface 157 of the cylindrical body 153 and the inner side wall 159 of the flange 155. In effect, the ball joint connection is formed between the ball portion 127a of the stem 127 and the recess 161, which essentially forms a socket to receive the ball portion 127a. More specifically, the ball portion 127a contacts at least one edge of the top surface 157 of the cylindrical body 155 and is operatively secured to the retainer 139, allowing the self-aligning valve plug 128 and retainer 139 to rotate around the ball portion 127a or a longitudinal axis B of the stem 127 upon contacting a portion of the valve seat 122. The self-aligning valve plug 128 and the retainer 139 partially disposed therein will rotate until they reach a position parallel to a longitudinal axis C of the valve seat 122, allowing alignment and sealing engagement to be achieved with reduced indentation to the valve disc 131. In other words, the ball portion 127a of the stem 127 allows the retainer 139 and the self-aligning valve plug 128 to automatically self-align or self-adjust or move and/or rotate or pivot when the valve disc 131 contacts a portion of the valve seat 122 until alignment and sealing engagement between the entire valve disc 131 and the valve seat 122 is achieved. Such movement of the self-aligning valve plug 128 thus reduces the force required to achieve lockup and results in a more efficient the regulator 114.

More specifically, upon initial movement of valve stem 127 and ball portion 127a in an axial direction along the longitudinal axis B of the valve stem 127 toward the valve seat 122, the valve disc 131 often only contacts a portion of the valve seat 122. In other words, when the self-aligning valve plug 128 approaches the valve seat 122, the longitudinal axis D of the self-aligning valve plug 128 may not be parallel to the longitudinal axis C of the valve seat 122, resulting in only a portion of the valve seat 122 initially contacting the valve disc 131. The initial force provided by the valve disc 131 of the self-aligning valve plug 128 to only a portion of the valve seat 122 causes the self-aligning valve plug 128 and retainer 139 connected thereto to adjust or rotate about one or more of the longitudinal axis B of the valve stem 127 and/or an axis R perpendicular to the longitudinal axis B of the valve stem 127. In FIG. 5, the axis R can be referred to as the yaw axis of the valve stem 127. While in FIG. 5, the yaw axis R extends directly into the page, the yaw axis is actually defined as any axis that extends perpendicular to the longitudinal axis B of the valve stem 127. Such rotation of the self-aligning valve plug 128 and retainer 139 occurs until alignment and sealing engagement between the valve disc 131 of the self-aligning valve plug 128 and the valve seat 122 is achieved.

Figure 6:
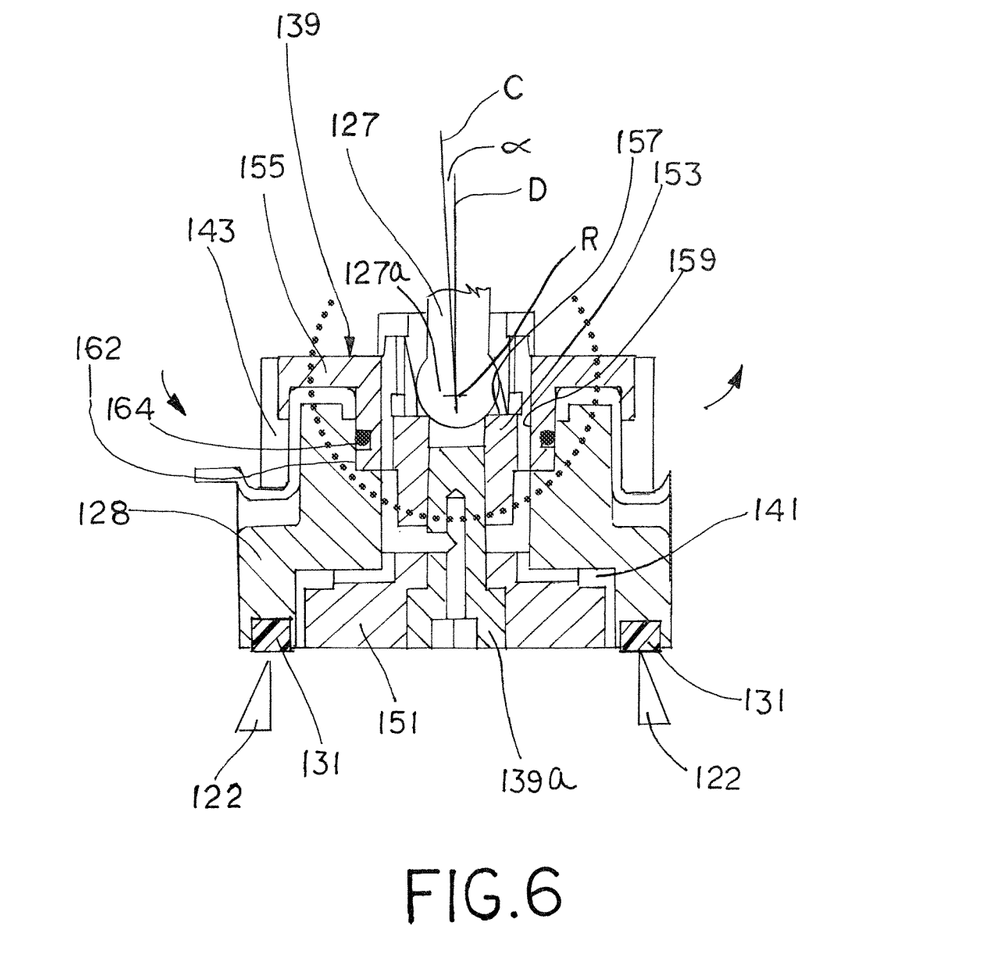
FIG. 6 is a further enlarged cross-sectional view of a portion of the valve plug of the balanced pressure regular of FIG. 5 upon initial contact with a portion of the valve seat of the balanced pressure regulator valve.

Said another way, and as illustrated in FIG. 6, when the valve disc 131 contacts only a portion of the valve seat 122, e.g., a right-side portion, the self-aligning valve plug 128 and the retainer 139 rotate about the yaw axis R in a clockwise direction such that a left-side of the valve disc 131 of the self-aligning valve plug 128 moves toward the left-side of the valve seat 122 until complete alignment and sealing engagement with the valve seat 122 occurs. In a similar manner, when the valve disc 131 contacts only another portion of the valve seat 122, e.g., a left-side portion, the self-aligning valve plug 128 and the retainer 139 rotate about the yaw axis in a counter-clockwise direction such that the right-side of the valve disc 131 of the self-aligning valve plug 127 moves toward the right-side of the valve seat 122 until complete alignment and sealing engagement with the valve seat 122 occurs. In both examples, the longitudinal axis D of the self-aligning valve plug 128 moves from a first position that is not parallel to or disposed at an angle a from the longitudinal axis C of the valve seat 122 to a second position that is parallel to or aligned with the longitudinal axis C of the valve seat 122 after the valve disc 131 contacts only a portion of the valve seat 122. Such automatic movement or rotation reduces the amount of indentation to the valve disc 131 and the force required to achieve lockup.

FIG. 6 also illustrates a gap 162 formed between the flange 155 of the cylindrical body 153 and the self-aligning valve plug 128, for example. As further illustrated in FIG. 6, a biasing member 164 may be disposed within the gap to assist with the rotational movement of the self-aligning valve plug 128 and the retainer 139 about the ball portion 127a of the valve stem 127. While the biasing member 164 of FIG. 6, for example, may comprise one or more o-rings, one of skill in the art will appreciate that various other biasing members other than an o-ring or pair of o-rings, such as a wave spring, a compression coil spring, or any other biasing mechanism, for example, may alternatively be used to achieve the same function of the o-ring(s) and the biasing member 164 in general.

While the self-aligning valve plug 128 of the present disclosure is described as having a retainer 139 partially disposed therein and operatively connecting the self-aligning valve plug 128 to a valve stem 127 having a ball portion 127a, although not expressly depicted herein, the valve stem 127 may alternatively include flexible portion that similarly allows the valve plug and retainer to simultaneously rotate around the flexible portion (or the longitudinal axis of the valve stem) upon contact with a portion of the valve seat. As such, the scope of the coverage of this patent is not limited to valve stems having ball portions only, but includes other variations of the ball portions that achieve the same function.

In light of the foregoing, it should be appreciated that the present invention provides an advantageous means for enabling the balanced self-aligning valve plug 128 to self-adjust while approaching and/or upon initial contact with a portion of the valve seat 122 of the regulator valve 114. This advantageously offsets and/or prevents increases in lockup pressure, thereby increasing the efficiency and accuracy at which regulators operate. However, the regulator valve 114 described herein is merely one example of a fluid control device incorporating the principles of the present disclosure. Other fluid control devices including other regulators and control valves may also benefit from the structures and/or advantages of the present disclosure. More generally, although certain example apparatus and methods have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A balanced pressure regulator, comprising:
   a valve body having a fluid inlet and a fluid outlet connected by a fluid passageway;
   a valve seat disposed within the fluid passageway;
   a self-aligning valve plug at least partially disposed within the fluid passageway, the self-aligning valve plug including a bore and interacting with the valve seat to selectively open or close the fluid passageway;
   a retainer partially disposed within the bore of the self-aligning valve plug and operatively connecting the self-aligning valve plug to a valve stem having a ball portion, the retainer having a recess for receiving the ball portion of the valve stem, wherein the retainer includes a base and a cylindrical body attached to the base via a fastener, and the cylindrical body includes a flange extending radially from an end of the cylindrical body disposed opposite the base; and
   a balancing passage that fluidly connects the fluid passageway with a chamber;
   wherein, the self-aligning valve plug automatically rotates around the ball portion of the valve stem to achieve alignment and sealing engagement between a valve disc of the self-aligning valve plug and the valve seat.

2. The balanced pressure regulator of claim 1, wherein the retainer partially disposed within the self-aligning valve plug rotates around the ball portion of the valve stem to achieve alignment and sealing engagement between the valve disc of the self-aligning valve plug and the valve seat.

3. The balanced pressure regulator of claim 1, wherein the self-aligning valve plug includes a circumferential recess adapted to receive the valve disc.

4. The balanced pressure regulator of claim 1, wherein the self-aligning valve plug rotates in one of a clockwise or counterclockwise direction relative to an axis perpendicular to the longitudinal axis of the valve stem and moves in an axial direction along the length of the longitudinal axis of the valve stem until alignment and sealing engagement between the valve disc and the valve seat is achieved.

5. The balanced pressure regulator of claim 1, wherein, upon contact with a portion of the valve seat, the self-aligning valve plug automatically moves from a first position in which a longitudinal axis of the self-aligning valve plug is not parallel to or disposed at an angle from the longitudinal axis of the valve seat to a second position in which the longitudinal axis of the self-aligning valve plug is parallel to or aligned with the longitudinal axis of the valve seat.

6. The balanced pressure regulator of claim 1, wherein the self-aligning valve plug rotates in one of a clockwise or counterclockwise direction relative to a longitudinal axis of the valve stem and moves in an axial direction along the length of the longitudinal axis of the valve stem until alignment and sealing engagement between the valve disc and the valve seat is achieved.

7. The balanced pressure regulator of claim 1, wherein the cylindrical body includes a top surface and the flange includes an inner side wall, the top surface of the cylindrical body and the inner side wall forming the recess adapted to receive the ball portion of the valve stem to operatively connect the valve stem with the self-aligning valve plug.

8. The balanced pressure regulator of claim 7, wherein a ball joint connection is formed between the ball portion of the valve stem and the recess, the recess forming a socket to receive the ball portion of the valve stem.

9. The balanced pressure regulator of claim 8, wherein the ball portion of the valve stem contacts at least one edge of the top surface of the cylindrical body of the retainer to form the ball joint connection, allowing a longitudinal axis of the self-aligning valve plug to align with a longitudinal axis of the valve seat.

10. A balanced plug assembly for a balanced pressure regulator, the balanced plug assembly comprising:
    a sleeve;
    a self-aligning valve plug disposed within the sleeve, the self-aligning valve plug including a balancing channel and a bore; and
    a retainer partially disposed within the bore of the self-aligning valve plug and for operatively connecting the self-aligning valve plug to a valve stem having a ball portion, the retainer having a recess for receiving the ball portion of the valve stem, wherein the retainer includes a base and a cylindrical body attached to the base via a fastener, and the cylindrical body includes a flange extending radially from an end of the cylindrical body disposed opposite the base;
    wherein, when a valve disc of the self-aligning valve plug contacts a portion of a valve seat, the self-aligning valve plug and retainer disposed therein automatically rotate about one or more of an axis perpendicular to a longitudinal axis of the valve stem or a longitudinal axis of the valve stem until alignment and sealing engagement between the valve disc and the valve seat occurs.

11. The balanced plug assembly of claim 10, wherein the self-aligning valve plug rotates in one of a clockwise or counterclockwise direction relative to one or more of a longitudinal axis of the valve stem or an axis perpendicular to the longitudinal axis of the valve stem until alignment and sealing engagement between the disc of the self-aligning valve plug and the valve seat occurs.

12. The balanced plug assembly of claim 10, wherein, upon contact with a portion of the valve seat, the valve disc of the self-aligning valve plug automatically moves from a first position that is not parallel to a longitudinal axis of the valve seat to a second position that is parallel to the longitudinal axis of the valve seat and alignment and sealing engagement between the valve seat and the disc of the self-aligning valve plug occurs.

13. The balanced plug assembly of claim 10, wherein the self-aligning valve plug rotates in one of a clockwise or counterclockwise direction relative to the longitudinal axis of the valve stem and moves in an axial direction along the length of the longitudinal axis of the valve stem until alignment and sealing engagement between the valve disc of the self-aligning valve plug and the valve seat is achieved.

14. The balanced plug assembly of claim 10, wherein the self-aligning valve plug includes a circumferential recess adapted to receive a valve disc.

15. The balanced plug assembly of claim 10, wherein a gap is disposed between the flange of the cylindrical body of the retainer and the self-aligning valve plug, and a biasing member is disposed within the gap.

16. The balanced plug assembly of claim 10, wherein the cylindrical body includes a top surface and the flange includes an inner side wall, the top surface of the cylindrical body and the inner side wall forming the recess adapted to receive the ball portion of the valve stem to operatively connect the valve stem with the self-aligning valve plug.

17. The balanced plug assembly of claim 16, wherein a ball joint connection is formed between the ball portion of the valve stem and the recess, the recess forming a socket to receive the ball portion of the valve stem.

18. The balanced plug assembly of claim 17, wherein the ball portion of the valve stem contacts at least one edge of the top surface of the cylindrical body of the retainer to form the ball joint connection, allowing a longitudinal axis of the self-aligning valve plug to align with a longitudinal axis of the valve seat.

19. A method of automatically adjusting a valve plug for use with a fluid regulating device, the fluid regulating device including an inlet, an outlet, a valve seat disposed between the inlet and the outlet, the valve plug adapted to be displaced relative to the valve seat, thereby controlling the flow of a fluid between the inlet and the outlet disposed within a regulator valve, the method comprising:
  partially disposing a retainer within a bore of a valve plug;
  disposing a gap between a flange extending radially from an end of a cylindrical body of the retainer and the valve plug, and disposing a biasing member within the gap;
  connecting the valve plug to a valve stem having a flexible portion via the retainer, the retainer having a recess for receiving the flexible portion of the valve stem; and
  automatically adjusting the valve plug around the flexible portion of the valve stem to achieve alignment and sealing engagement between a valve disc of the self-aligning valve plug and the valve seat.

20. The method of claim 19, wherein automatically adjusting the valve plug comprises rotating the retainer around the flexible portion of the valve stem to achieve alignment and sealing engagement between the valve disc of the valve plug and the valve seat.

21. The method of claim 19, wherein automatically adjusting the valve plug comprises rotating the valve plug in one of a clockwise or counterclockwise direction relative to an axis perpendicular to the longitudinal axis of the valve stem and moving the valve plug in an axial direction along the length of the longitudinal axis of the valve stem until alignment and sealing engagement between the valve disc of the valve plug and the valve seat is achieved.

22. The method of claim 19, wherein automatically adjusting the valve plug comprises automatically moving the valve plug, upon contact with a portion of the valve seat, from a first position in which a longitudinal axis of the valve plug is not parallel to or disposed at an angle from the longitudinal axis of the valve seat to a second position in which the longitudinal axis of the valve plug is parallel to or aligned with the longitudinal axis of the valve seat.

23. The method of claim 19, wherein automatically adjusting the valve plug comprises rotating the valve plug in one of a clockwise or counterclockwise direction relative to a longitudinal axis of the valve stem and moving the valve plug in an axial direction along the length of the longitudinal axis of the valve stem until alignment and sealing engagement between the valve disc of the valve plug and the valve seat is achieved.

24. The method of claim 19, wherein partially disposing a retainer within the bore of the valve plug comprises partially disposing a cylindrical body having a flange radially extending therefrom within an end of the bore of the valve plug and disposing a retainer base within another end of the bore opposite the end in which the cylindrical body is partially disposed.

25. The method of claim 24, wherein partially disposing the retainer within the bore of the valve plug further comprises attaching the retainer base to the cylindrical body via a fastener.

26. The method of claim 19, wherein the flexible portion of the valve stem is a ball portion.

27. The method of claim 26, further comprising forming a ball joint connection between the ball portion of the valve stem and a recess of the retainer, the recess forming a socket to receive the ball portion of the stem.

28. The method of claim 26, further comprising simultaneously rotating the valve plug and the retainer around the ball portion of the valve stem or a longitudinal axis of the valve stem upon contact with a portion of the valve seat.

29. A balanced plug assembly for a balanced pressure regulator, the balanced plug assembly comprising:
  a sleeve;
  a self-aligning valve plug disposed within the sleeve, the self-aligning valve plug including a balancing channel and a bore; and
  a retainer partially disposed within the bore of the self-aligning valve plug and for operatively connecting the self-aligning valve plug to a valve stem having a ball portion, the retainer having a recess for receiving the ball portion of the valve stem, wherein the retainer includes a base and a cylindrical body attached to the base via a fastener, and the cylindrical body includes a flange extending radially from an end of the cylindrical body disposed opposite the base;
  wherein, when a valve disc of the self-aligning valve plug contacts a portion of a valve seat, the self-aligning valve plug and retainer disposed therein automatically rotate about one or more of an axis perpendicular to a longitudinal axis of the valve stem or a longitudinal axis of the valve stem until alignment and sealing engagement between the valve disc and the valve seat occurs; and
wherein a gap is disposed between the flange of the cylindrical body of the retainer and the self-aligning valve plug, and a biasing member is disposed within the gap.

* * * * *